United States Patent
Kodati

(10) Patent No.: US 11,987,360 B2
(45) Date of Patent: May 21, 2024

(54) VIRTUAL OPEN SKY IN SUPER FIRST-CLASS SUITES

(71) Applicant: B/E Aerospace, Inc., Winston-Salem, NC (US)

(72) Inventor: Sambasiva Rao Kodati, Kaikalur (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 368 days.

(21) Appl. No.: 17/360,482

(22) Filed: Jun. 28, 2021

(65) Prior Publication Data

US 2022/0324575 A1    Oct. 13, 2022

(30) Foreign Application Priority Data

Apr. 7, 2021   (IN) .............................. 202141016415

(51) Int. Cl.
*B64D 11/00*    (2006.01)
*B64D 11/06*    (2006.01)
(Continued)

(52) U.S. Cl.
CPC ........ *B64D 11/0015* (2013.01); *B64D 11/064* (2014.12); *B64D 47/08* (2013.01);
(Continued)

(58) Field of Classification Search
CPC .. B64D 11/0015; B64D 11/064; B64D 47/08; B64D 2011/0061; B64D 11/0602;
(Continued)

(56) References Cited

U.S. PATENT DOCUMENTS 8,976,210 B2 *   3/2015   Heyman ............... G06T 3/4092
                                                    345/173
9,442,688 B2 *   9/2016   Rawlinson ............ G06F 3/1454
                          (Continued)

FOREIGN PATENT DOCUMENTS

DE    202020105535 U1   12/2020
WO      1996014243 A1    5/1996

OTHER PUBLICATIONS

Cummins, Nicholas, "The Future? This Boeing 777 Has OLED Screens In Its Ceiling", Downloaded Mar. 2, 2021, URL: https://simpleflying.com/the-future-this-boeing-777-has-oled-screens-in-its-ceiling#:~:text=Boeing%20has%20revealed%20a%20new,flights%2a%20lot%20more%20interesting, 10 pages.

*Primary Examiner* — Medhat Badawi
*Assistant Examiner* — Vicente Rodriguez
(74) *Attorney, Agent, or Firm* — Suiter Swantz IP

(57) ABSTRACT

A super first-class cabin includes a monitor disposed in the ceiling structure, a controller to render images on the monitor, and cameras to capture real-time streaming environmental images and renders them on the monitor. At the passenger's request, or when the passenger reclines, the controller may render a selection of mood affective images, for example to promote sleep if desired. Such mood affective images may be organized into a schedule associated with phases of flight to gently wake the passenger and prepare them for the end of the flight. The monitor may be employed to reduce the effects of flight-base time-disassociation by varying a daylight color scheme over the course of long flights, simulating a day/night routine to align the time of day at the origin of the flight with the time of day at the destination.

15 Claims, 9 Drawing Sheets

(51) Int. Cl.
  *B64D 47/08* (2006.01)
  *G06F 3/14* (2006.01)
  *H04N 5/262* (2006.01)
  *H04N 7/14* (2006.01)
  *H04N 7/18* (2006.01)
(52) U.S. Cl.
  CPC ......... *G06F 3/1454* (2013.01); *H04N 5/2628* (2013.01); *H04N 7/142* (2013.01); *H04N 7/18* (2013.01)
(58) Field of Classification Search
  CPC ...... B64D 2011/0046; B64D 11/00153; G06F 3/1454; G06F 3/147; H04N 5/2628; H04N 7/142; H04N 7/18; H04N 21/2146; H04N 21/2187; H04N 21/41422; H04N 21/4223; H04N 21/44218
  See application file for complete search history.

(56) References Cited

U.S. PATENT DOCUMENTS

| | | | |
|---|---|---|---|
| 9,456,184 B2 * | 9/2016 | Barrou | H04N 7/183 |
| 9,787,948 B2 * | 10/2017 | de Carvalho | H04N 7/183 |
| 10,124,895 B2 | 11/2018 | Simeon et al. | |
| 10,214,288 B2 | 2/2019 | Roese et al. | |
| 10,358,220 B2 | 7/2019 | Carlioz | |
| 10,909,397 B2 | 2/2021 | Behr et al. | |
| 2015/0215522 A1 * | 7/2015 | Ebisu | H04N 23/672 |
| | | | 348/349 |
| 2020/0029111 A1 * | 1/2020 | Koyama | H04N 21/6587 |
| 2020/0070981 A1 * | 3/2020 | Bachhuber | H04N 9/3147 |
| 2020/0319669 A1 * | 10/2020 | Matsumoto | G02F 1/133509 |
| 2021/0006712 A1 | 1/2021 | Kim | |

* cited by examiner

_US 11,987,360 B2_

VIRTUAL OPEN SKY IN SUPER FIRST-CLASS SUITES

PRIORITY

The present application claims the benefit under 35 U.S.C. § 119(a) of Indian App. No. 202141016415 (filed Apr. 7, 2021), which is incorporated herein by reference.

BACKGROUND

Super first-class cabins in commercial aircraft include every state-of-the-art amenity available, but are still space constrained with few options for producing a more open feel, incorporating elements of the surrounding environment. Furthermore, there are restrictions on types of video-based amenities that can be incorporated into super first-class cabins as currently designed. It would be advantageous if a personalized, in-cabin system existed for incorporating environmental elements into the cabin, while also being available to add or extend video-based features.

SUMMARY

In one aspect, embodiments of the inventive concepts disclosed herein are directed to a super first-class cabin having a monitor disposed in the ceiling structure and a controller to render images on the monitor. Cameras capture real-time streaming environmental images and renders them on the monitor.

In a further aspect, the controller may render a selection of mood affective images, for example to promote sleep if desired. Furthermore, such mood affective images may be organized into a schedule associated with phases of flight such that as a flight is nearing its conclusion, the controller may render sequences to gently wake the passenger and prepare them for the end of the flight.

In a further aspect, the monitor may be employed to reduce the effects of flight-base time-disassociation by varying a daylight color scheme over the course of long flights, simulating a day/night routine to align the time of day at the origin of the flight with the time of day at the destination.

In a further aspect, the controller may connect to a passenger's own computer via a secure data link to allow the user to utilize the monitor as an extend monitor for that computer. Furthermore, the cabin may include an internal camera to allow for secure video calls utilizing the monitor without the use of the passenger's own computer.

In a further aspect, an in-cabin camera or seat-recline sensor may determine when the passenger has reclined and automatically switch the view from other monitors in the cabin to the overhead monitor. Alternatively, if no other monitors are active, the controller may initiate a mood affective sleep routine when the passenger reclines.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
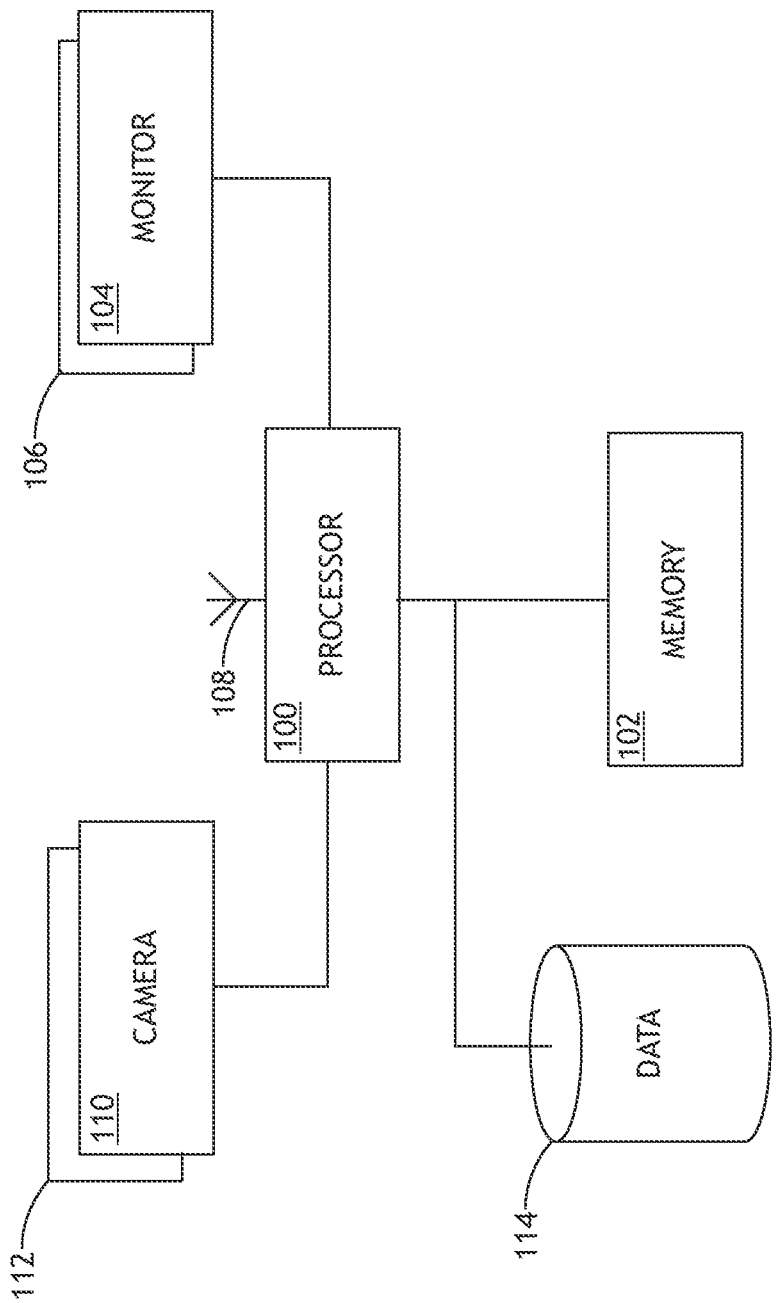
FIG. 1 shows a block diagram of a system useful for implementing an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a super first-class cabin having a monitor disposed in the ceiling structure and a controller to render images on the monitor. Cameras capture real-time streaming environmental images and renders them on the monitor. At the passenger's request, or when the passenger reclines, the controller may render a selection of mood affective images, for example to promote sleep if desired. Such mood affective images may be organized into a schedule associated with phases of flight to gently wake the passenger and prepare them for the end of the flight. The monitor may be employed to reduce the effects of flight-base time-disassociation by varying a daylight color scheme over the course of long flights, simulating a day/night routine to align the time of day at the origin of the flight with the time of day at the destination. The controller may connect to a passenger's own computer via a secure data link to allow the user to utilize the monitor as an extend monitor for that computer. Furthermore, internal cameras allow for secure video calls utilizing the monitor without the use of the passenger's own computer.

Referring to FIG. 1, a block diagram of a system useful for implementing an exemplary embodiment is shown. The system includes a processor 100, memory 102 connected to the processor 100 for executing processor executable code, at least one overhead monitor 104 disposed in the ceiling of the super first-class cabin, and one or more cameras 110 for capturing an environmental image stream. The processor 100 renders the environmental image stream on the overhead monitor 104. In at least one embodiment, the processor 100 may apply a geometric transformation to the environmental image stream to orient the environmental image stream to more accurately reflect the environmental from the perspective of the super first-class cabin. In at least one embodiment, the one or more cameras 110 may be specifically tasked with supplying an environmental image stream to all super first-class cabins; in such embodiment, disparate image streams may be combined, overlayed, transformed, delayed, etc. to accurately represent the environment from each different super first-class cabin substantially in real-time.

In at least one embodiment, the system includes a recline sensor to identify when the passenger's seat is in a reclined orientation. Such recline sensor may comprise a physical sensor connected to the seat, or a face camera 112 in data communication with the processor 100 to identify when the passenger is reclined view a face recognition algorithm. The processor 100 may identify when a passenger is in a reclined orientation based on the recline sensor; when the passenger is in an upright orientation, the processor may render the environmental image stream but alter what is rendered on the monitor 104 when in a reclined orientation. For example, the processor 100 may store one or more mood affective image routines in a data storage element 114 and render those mood affective routines at the discretion of the passenger when reclined. In at least one embodiment, the processor 100 may receive the progress of the current flight and time the mood affective routine according to the progress of the flight. For example, a sleep routine may be timed to naturally end some predetermined time before the end of the flight regardless of when it started.

In at least one embodiment, the processor 100 may render a stored mood affective routine, whether the passenger is reclined or not, designed to reduce flight-based time-disassociation by representing a desirable day/night schedule that naturally terminates by replicating the time at the flight destination. It may be appreciated that such mood affective routine may take the form of altering the image tone of all images displayed on the monitor 104 over time in the form of a dynamic color tone filter.

In at least one embodiment, the system may include one or more wall mounted monitors 106 for various video-based amenities. The processor 100 may automatically determine that the passenger seat is in a reclined orientation and redirect images from the wall mounted monitors 106 to the overhead monitor 104. Furthermore, the system may include a datalink element 108 for creating a secure data connection the passenger's personal computer to extend or replicate the monitor of the passenger's personal computer to the overhead monitor 104. The processor 100 may determine that the passenger's seat is in a reclined orientation and automatically transfer the image from the passenger's personal computer to the overhead monitor 104 when reclined.

It may be appreciated that the overhead monitor 104 may employed for any other video-based amenities while in a reclined orientation such as displaying movies or video games. Furthermore, the face camera 112 may allow the passenger to execute a video call using the overhead monitor 104 while in a reclined orientation.

Overhead monitors 104 may comprise HD, 4K, or other ultra high definition technology disposed via mounting brackets in the ceiling. Alternatively, the entire ceiling may be configured as a continuous display. The overhead monitor 104 may be embodied in ultrathin OLED screens that conform to the general shape of the ceiling.

Figure 2A:
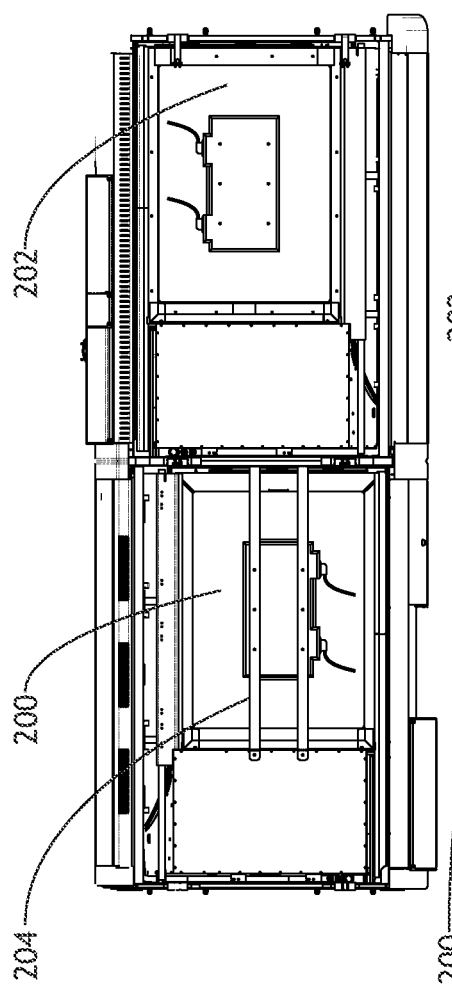
FIG. 2A shows a top view of a super first-class cabin according to an exemplary embodiment.
Figure 2B:
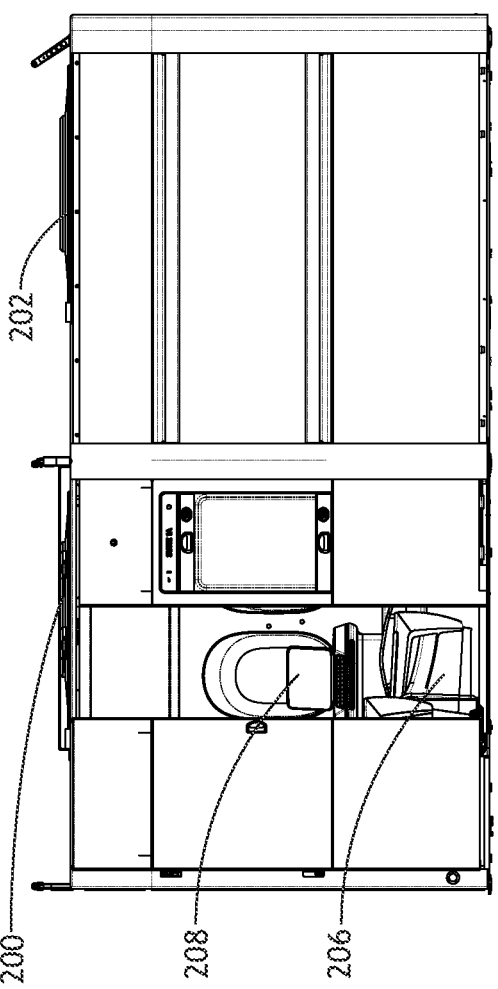
FIG. 2B shows a front view of a super first-class cabin according to an exemplary embodiment.

Referring to FIGS. 2A-2B, a top view and a front view of a super first-class cabin according to an exemplary embodiment are shown. Each super first-class cabin includes an overhead monitor 200, 202 disposed in the ceiling and facing downward (toward the interior of the cabin). In at least one embodiment, specialized brackets 204 are adapted to flush mount the overhead monitors 200, 202 within the constraints of the super first-class cabin structure. Alternatively, or in addition, a cowling disposed around the display surface of the overhead monitor 200, 202 (that is to say along the bottom surface) may hold the overhead monitor 200, 202 in place via positive contact between the display surface of the overhead monitor 200, 202 and the ceiling structure.

Each super first-class cabin may embody a limited network to allow data connectivity between a passenger's personal computer 208 and a processor/controller associated with the corresponding overhead monitor 200, 202. A recline sensor may detect when a passenger seat 206 is in a reclined orientation and automatically clone or extend the video feed of the passenger's personal computer 208 to the corresponding overhead monitor 200, 202.

When not otherwise employed, the overhead monitors 200, 202 may display an environmental image stream as captured by one or more environmental cameras. Such cameras may be disposed proximal to the super first-class cabin, or orientated and time delayed to project the relevant portion of the environmental image stream at an appropriate time. Furthermore, the environmental image stream may be geometrically transformed as necessary to orient the environmental image stream as nearly as possible to an actual view as seen from the corresponding super first-class cabin. In at least one embodiment, a single environmental image stream may serve more than one super first-class cabin, for example by slightly delaying the environmental image stream between super first-class cabins located along the same axis of the aircraft.

Figure 3A:
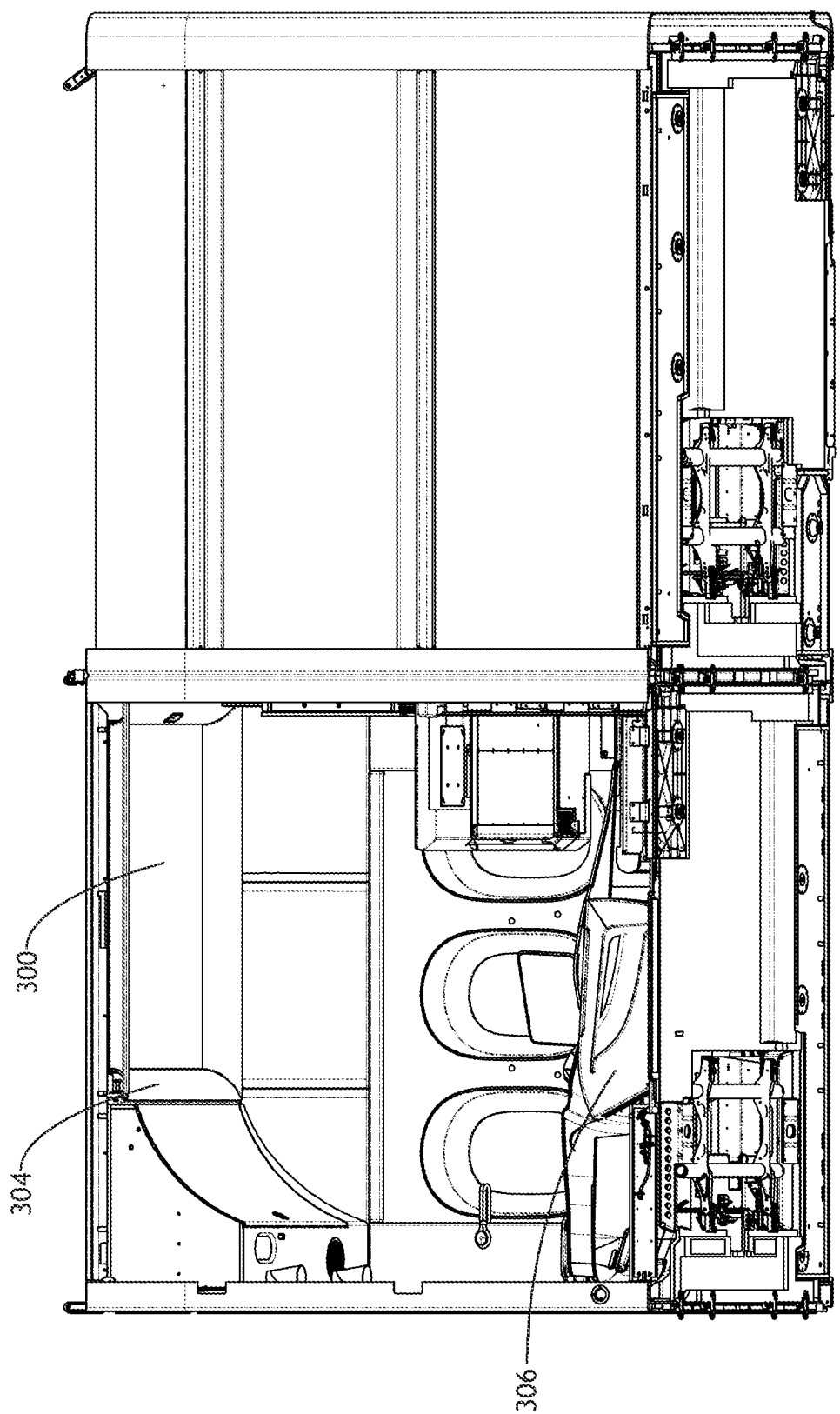
FIG. 3A shows a bottom perspective view of a super first-class cabin according to an exemplary embodiment.
Figure 3B:
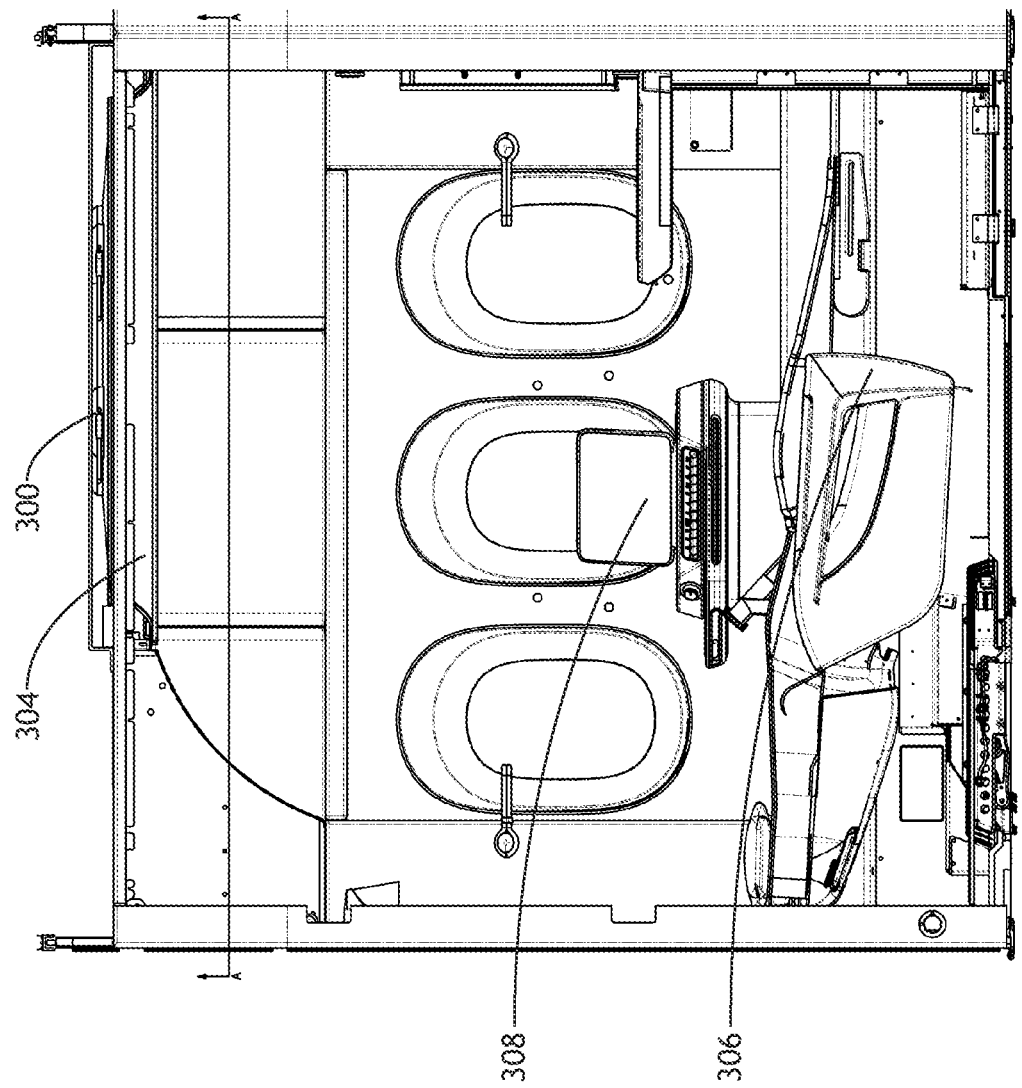
FIG. 3B shows a side partial view of a super first-class cabin according to an exemplary embodiment.

Referring to FIGS. 3A-3B, a bottom perspective view and a side partial view of a super first-class cabin according to an exemplary embodiment are shown. Where the super first-class cabin includes an overhead monitor 300, the overhead monitor 300 may be framed by a cowling 304 disposed around the bottom display surface. The cowling 304 may be sized to completely cover any border region of the display surface and more realistically present the display surface as an overhead window.

High definition and ultra high definition monitors 300 may produce substantial heat. In at least one embodiment, the cowling 304 may be useful in directing an airflow around the monitor 300 for cooling purposes.

In at least one embodiment, the super first-class cabin may include video-based amenities such as an in-cabin entertainment system 308. A limited network may allow data connectivity between the in-cabin entertainment system 308 and the overhead monitor 300. A recline sensor may detect when a passenger seat 306 is in a reclined orientation and automatically clone or extend the video feed of the in-cabin entertainment system 308 to the overhead monitor 300.

Figure 4:
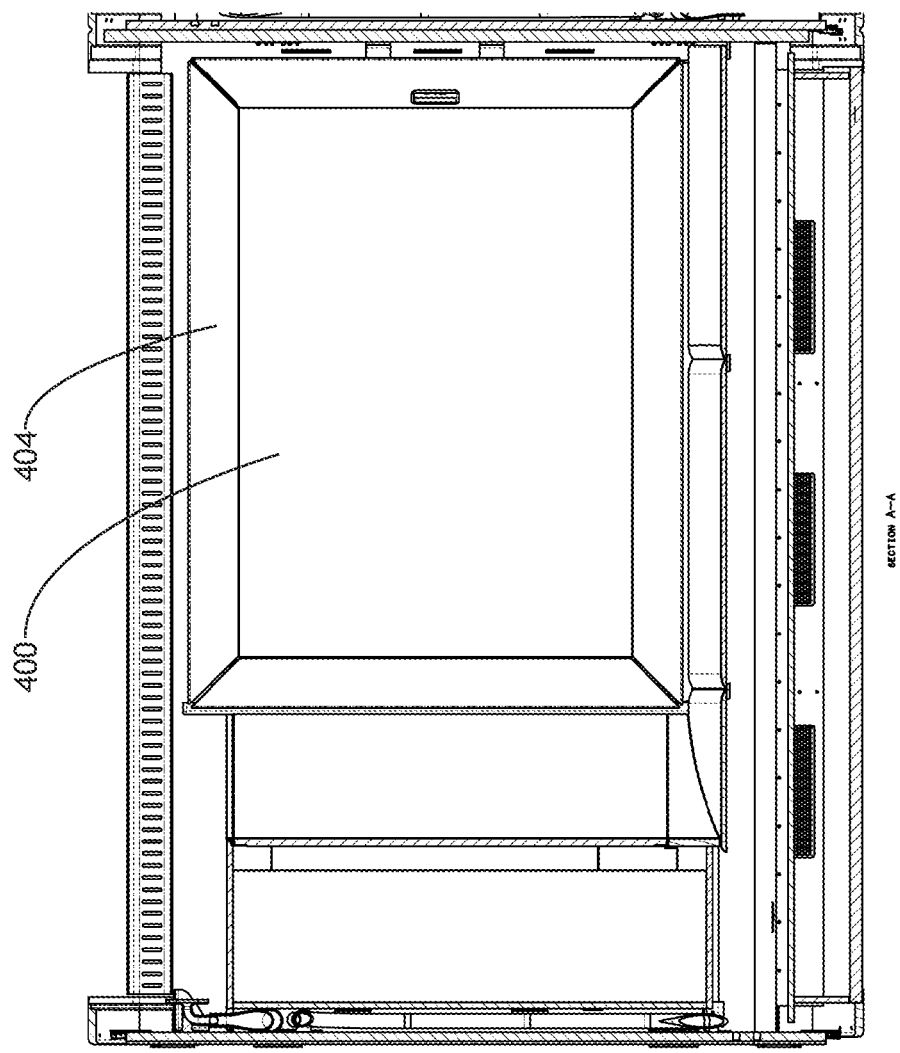
FIG. 4 shows a bottom partial view of a super first-class cabin according to an exemplary embodiment.

Referring to FIG. 4, a bottom partial view of a super first-class cabin according to an exemplary embodiment is shown. Where the super first-class cabin includes an overhead monitor 400, a cowling 404 may obscure the border of the display surface to replicate an overhead window during an environmental image stream, and also engage the ceiling structure to support the overhead monitor 400 in place.

Figure 5:
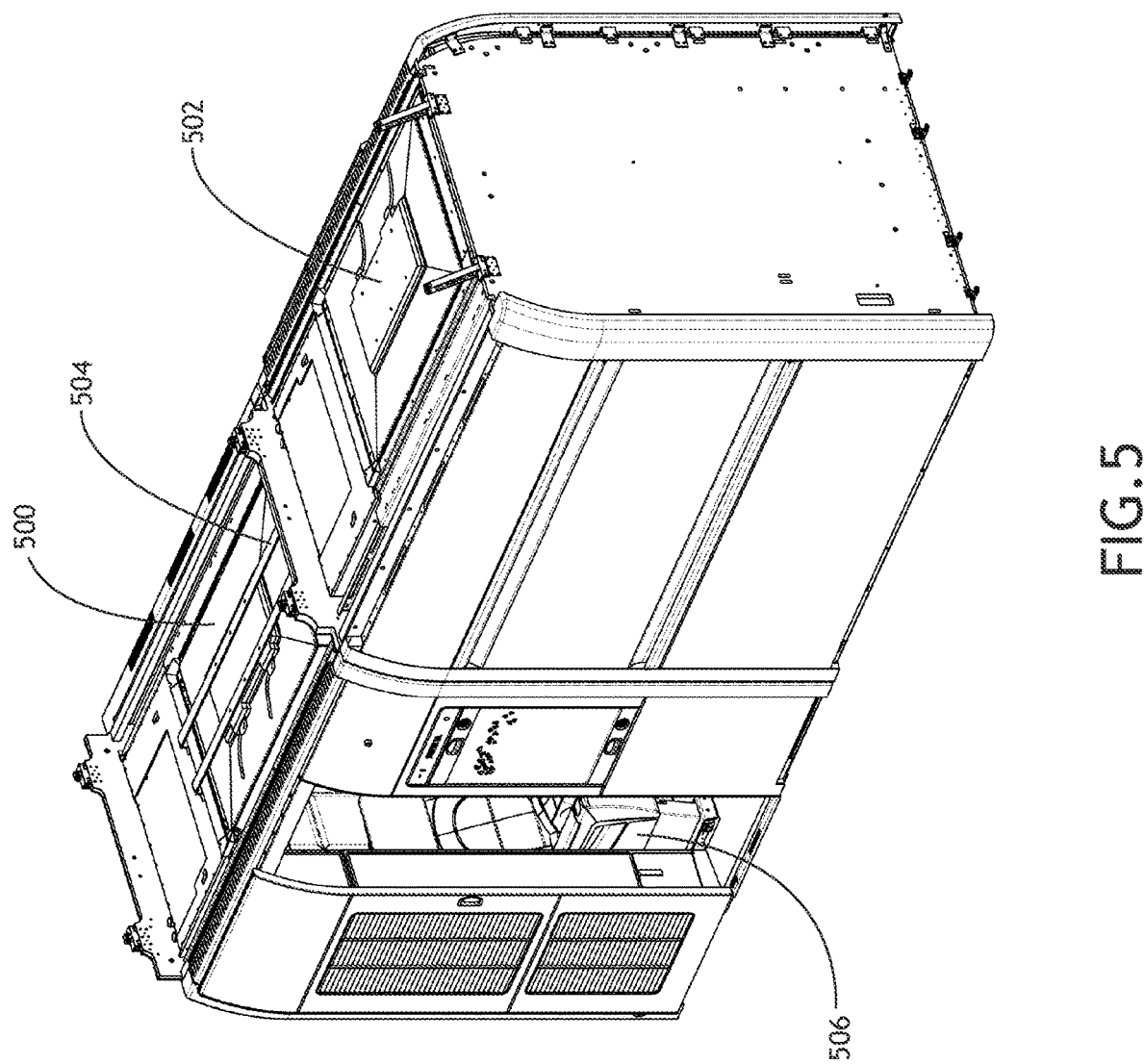
FIG. 5 shows a perspective view of a super first-class cabin according to an exemplary embodiment.

Referring to FIG. 5, a perspective view of a super first-class cabin according to an exemplary embodiment is shown. Where super first-class cabins include overhead monitors 500, 502 that may be employed for entertainment when a passenger seat 506 is reclined, it may be appreciated that such super first-class cabins are often manufactured as self-contained units. Specialized brackets 504 are adapted to flush mount the overhead monitors 500, 502 within the constraints of the super first-class cabin structure. Alternatively, or in addition, a cowling disposed around the display surface of the overhead monitor 500, 502 (that is to say along the bottom surface) may hold the overhead monitor 500, 502 in place via positive contact between the display surface of the overhead monitor 500, 502 and the ceiling structure.

Figure 6:
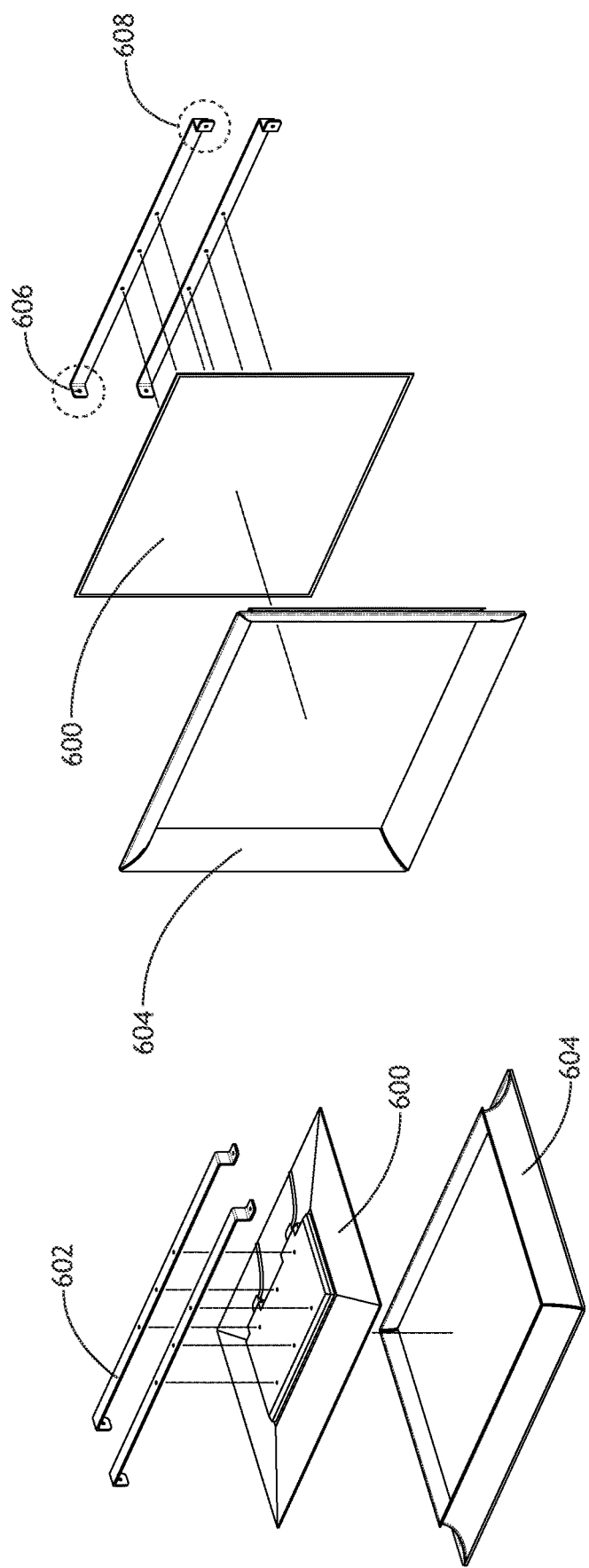
FIG. 6A shows an exploded view of a monitor and bracket according to an exemplary embodiment.
FIG. 6B shows an exploded view of a monitor and bracket according to an exemplary embodiment.

Referring to FIGS. 6A-6B, exploded views of a monitor and bracket according to an exemplary embodiment are shown. A specialized bracket 602 and cowling 604 system is employed to mount overhead monitors 600 in a super first-class cabin. Each bracket 602 may be adapted with a vertical wall-mount portion 606 that engages a bulkhead of the super first-class cabin that would abut another bulkhead of a neighboring super first-class cabin. Each bracket 602 may also be adapted with a ceiling mount portion 608 that engages the ceiling structure of the super first-class cabin.

In at least one embodiment, the cowling 604 may be snap-fit, press-fit, or otherwise positively engage surrounding ceiling structure of the super first-class cabin to hold the overhead monitor 600 in place.

Figure 7:
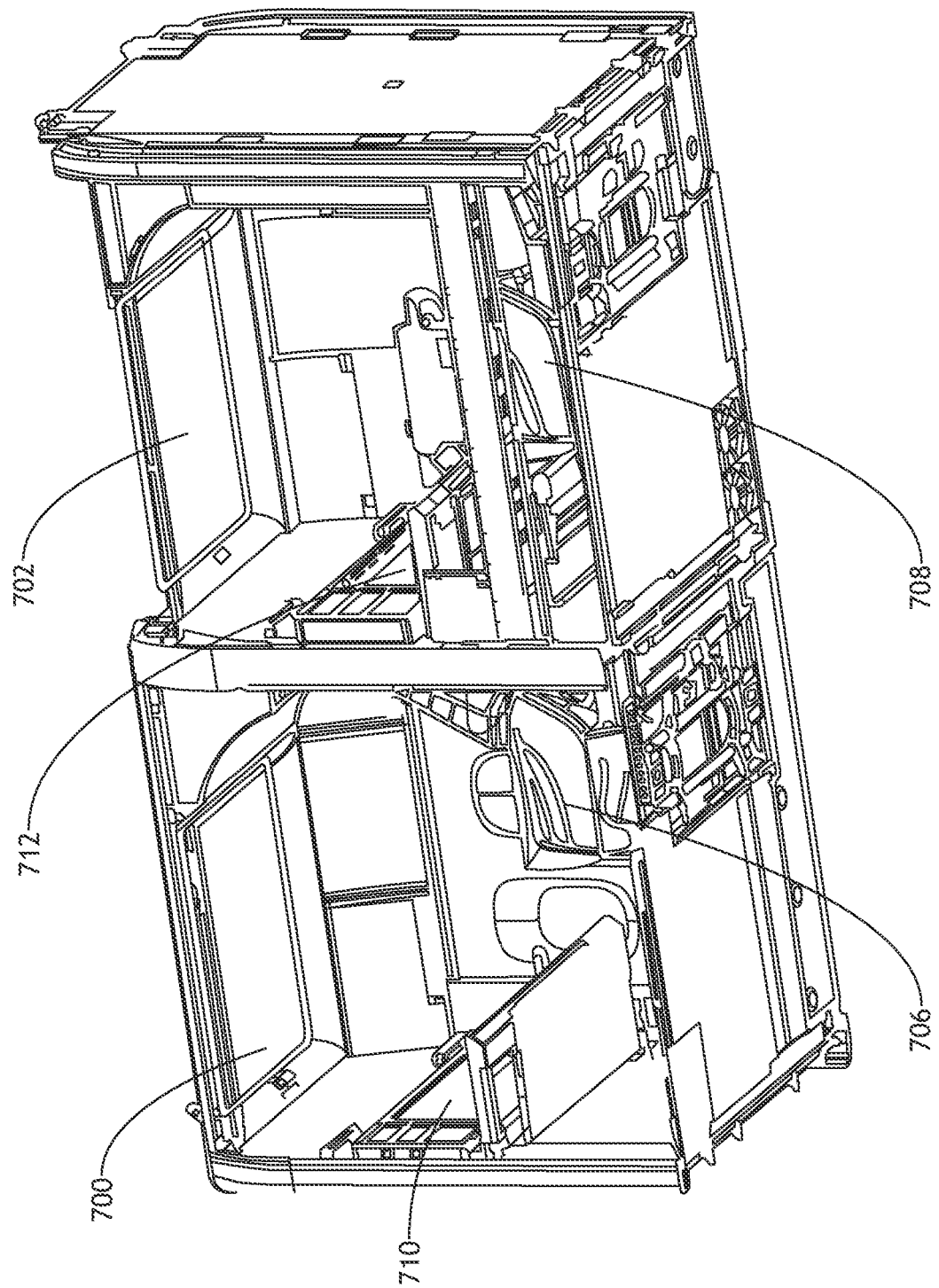
FIG. 7 shows a bottom perspective view of a super first-class cabin according to an exemplary embodiment.

Referring to FIG. 7, a bottom perspective view of a super first-class cabin according to an exemplary embodiment is shown. Where super first-class cabins include overhead monitors 700, 702 that may be employed for entertainment when a corresponding passenger seat 706, 708 is reclined, such super first-class cabins may also include additional vertically mounted monitors 710, 712. At the direction of the passenger, the overhead monitor 700, 702 and corresponding vertically mounted monitor 710, 712 may be operated independently or in concert. Furthermore, an in-cabin processor/controller may determine when the corresponding passenger seat 706, 708 is reclined and automatically adjust what is displayed between the vertically mounted monitor 710, 712 and corresponding overhead monitor 700, 702.

Figure 8:
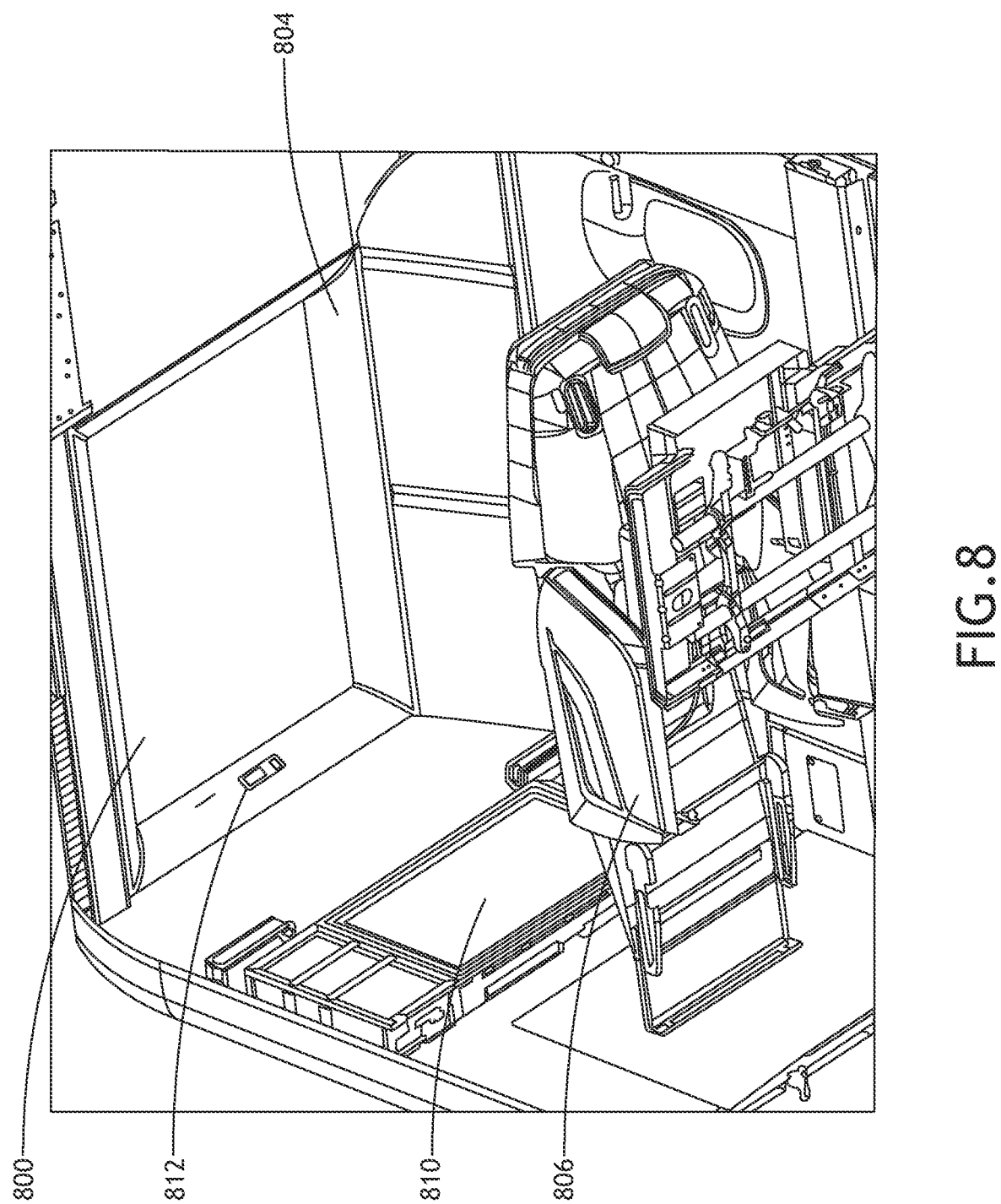
FIG. 8 shows a bottom perspective partial view of a super first-class cabin according to an exemplary embodiment.

Referring to FIG. 8, a bottom perspective partial view of a super first-class cabin according to an exemplary embodiment is shown. Where the super first-class cabin includes an overhead monitor 800 an a vertically mounted monitor 810, a passenger may utilize both for video calls utilizing an on-board system. When a corresponding passenger seat 806 is reclined, the on-board system may automatically utilize a face camera 812 disposed in a cowling 804 surrounding the overhead monitor 800.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus disposed in an aircraft cabin, the computer apparatus comprising:
   at least one monitor disposed in a ceiling of the aircraft cabin, oriented to display images downward;
   a recline sensor configured to determine when a passenger seat in the aircraft cabin is in a reclined orientation;
   at least one environmental camera disposed to produce an image stream of an environment as seen from the aircraft cabin; and
   at least one processor in data communication with the at least one environmental camera, the at least one monitor, and a memory storing processor executable code for configuring the at least one processor to:
      receive the image stream from the at least one environmental camera;
      render the image stream on the at least one monitor;
      determine that the passenger seat is in a reclined orientation; and
      apply a mood affective image routine to the at least one monitor,
   wherein the mood affective image routine is timed according to a day/night schedule that terminates by replicating a time at a flight destination.

2. The computer apparatus of claim 1, wherein the at least one processor is further configured to apply a geometric transformation to the image stream based on a predefined disparity between the image stream and a virtual view of environmental as seen from the aircraft cabin.

3. The computer apparatus of claim 1, further comprising a data link element connected to the at least one processor, wherein the at least one processor is further configured to:
   establish a secure datalink connection to a passenger's personal computer; and
   extend a display from the passenger's personal computer to the at least one monitor.

4. The computer apparatus of claim 1, further comprising a face camera disposed above a head portion of the passenger seat when in a reclined orientation, wherein the at least one processor is further configured to:
   establish a video call connection based on a command from a passenger; and
   utilize the face camera and the at least one monitor for the video call connection when the recline sensor indicates the passenger seat is in a reclined orientation.

5. The computer apparatus of claim 1, further comprising a data link element connected to the at least one processor, wherein the at least one processor is further configured to:
   establish a secure datalink connection to a passenger's personal computer; and
   extend a display from the passenger's personal computer to the at least one monitor when the recline sensor indicates the passenger seat is in a reclined orientation.

6. An aircraft cabin in an aircraft, the aircraft cabin comprising:
   at least one monitor disposed in a ceiling, oriented to display images downward;
   a recline sensor configured to determine when a passenger seat in the aircraft cabin is in a reclined orientation;
   at least one environmental camera disposed to produce an image stream of an environment as seen from the aircraft cabin; and
   at least one processor in data communication with the at least one environmental camera, the at least one monitor, and a memory storing processor executable code for configuring the at least one processor to:
      receive the image stream from the at least one environmental camera;
      render the image stream on the at least one monitor;
      determine that the passenger seat is in a reclined orientation; and
      apply a mood affective image routine to the at least one monitor,
   wherein the mood affective image routine is timed according to a day/night schedule that terminates by replicating a time at a flight destination.

7. The aircraft cabin of claim 6, wherein the at least one processor is further configured to apply a geometric transformation to the image stream based on a predefined disparity between the image stream and a virtual view of environmental as seen from the aircraft cabin.

8. The aircraft cabin of claim 6, further comprising a data link element connected to the at least one processor, wherein the at least one processor is further configured to:
   establish a secure datalink connection to a passenger's personal computer; and
   extend a display from the passenger's personal computer to the at least one monitor.

9. The aircraft cabin of claim 6, further comprising a face camera disposed above a head portion of the passenger seat when in a reclined orientation, wherein the at least one processor is further configured to:
   establish a video call connection based on a command from a passenger; and
   utilize the face camera and the at least one monitor for the video call connection when the recline sensor indicates the passenger seat is in a reclined orientation.

10. The aircraft cabin of claim 6, further comprising a data link element connected to the at least one processor, wherein the at least one processor is further configured to:
    establish a secure datalink connection to a passenger's personal computer; and
    extend a display from the passenger's personal computer to the at least one monitor when the recline sensor indicates the passenger seat is in a reclined orientation.

11. A system on board an aircraft comprising:
    at least one monitor disposed in a ceiling, oriented to display images downward;
    a recline sensor configured to determine when a passenger seat in the aircraft cabin is in a reclined orientation;
    at least one environmental camera disposed to produce an image stream of an environment as seen from an aircraft cabin; and
    at least one processor in data communication with the at least one environmental camera, the at least one monitor, and a memory storing processor executable code for configuring the at least one processor to:
       receive the image stream from the at least one environmental camera;
       render the image stream on the at least one monitor;
       determine that the passenger seat is in a reclined orientation; and
       apply a mood affective image routine to the at least one monitor,
    wherein the mood affective image routine is timed according to a day/night schedule that terminates by replicating a time at a flight destination.

12. The system of claim 11, wherein the at least one processor is further configured to apply a geometric transformation to the image stream based on a predefined disparity between the image stream and a virtual view of environmental as seen from the aircraft cabin.

13. The system of claim 11, further comprising a data link element connected to the at least one processor, wherein the at least one processor is further configured to:
    establish a secure datalink connection to a passenger's personal computer; and
    extend a display from the passenger's personal computer to the at least one monitor.

14. The system of claim 11, further comprising a face camera disposed above a head portion of the passenger seat when in a reclined orientation, wherein the at least one processor is further configured to:
    establish a video call connection based on a command from a passenger; and
    utilize the face camera and the at least one monitor for the video call connection when the recline sensor indicates the passenger seat is in a reclined orientation.

15. The system of claim 11, further comprising a data link element connected to the at least one processor, wherein the at least one processor is further configured to:
    establish a secure datalink connection to a passenger's personal computer; and
    extend a display from the passenger's personal computer to the at least one monitor when the recline sensor indicates the passenger seat is in a reclined orientation.

* * * * *